Figure 11:
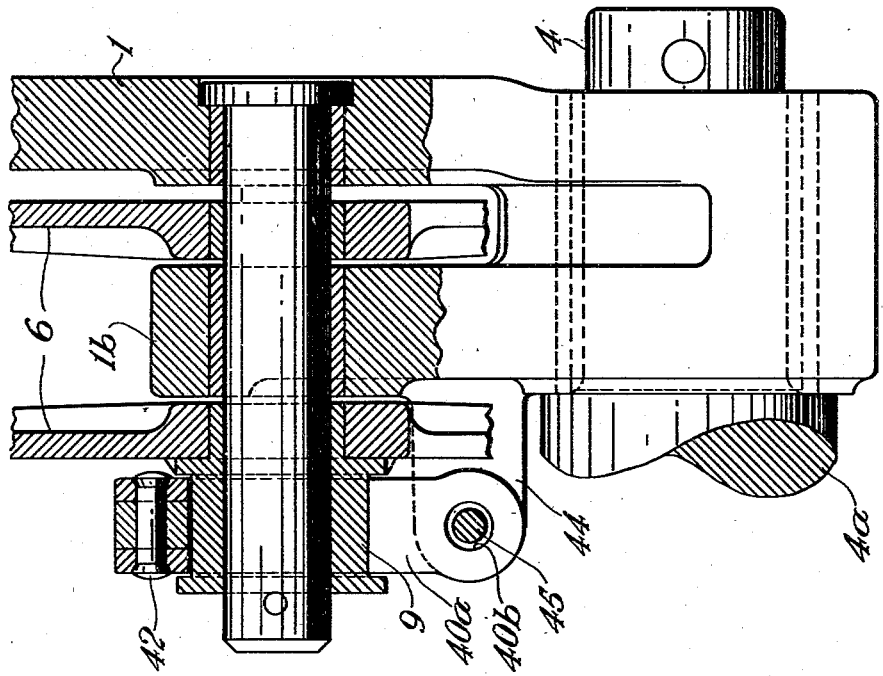

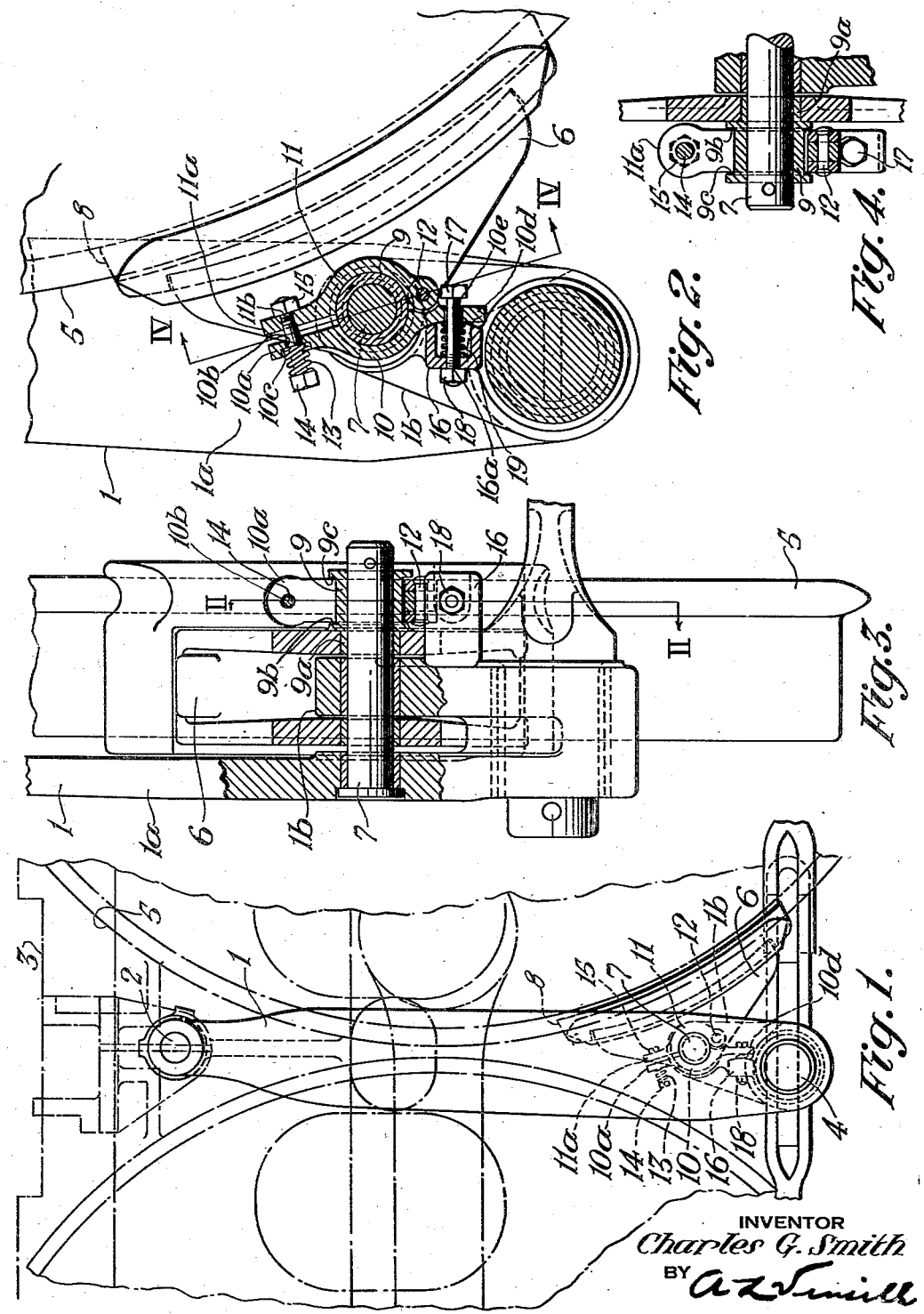

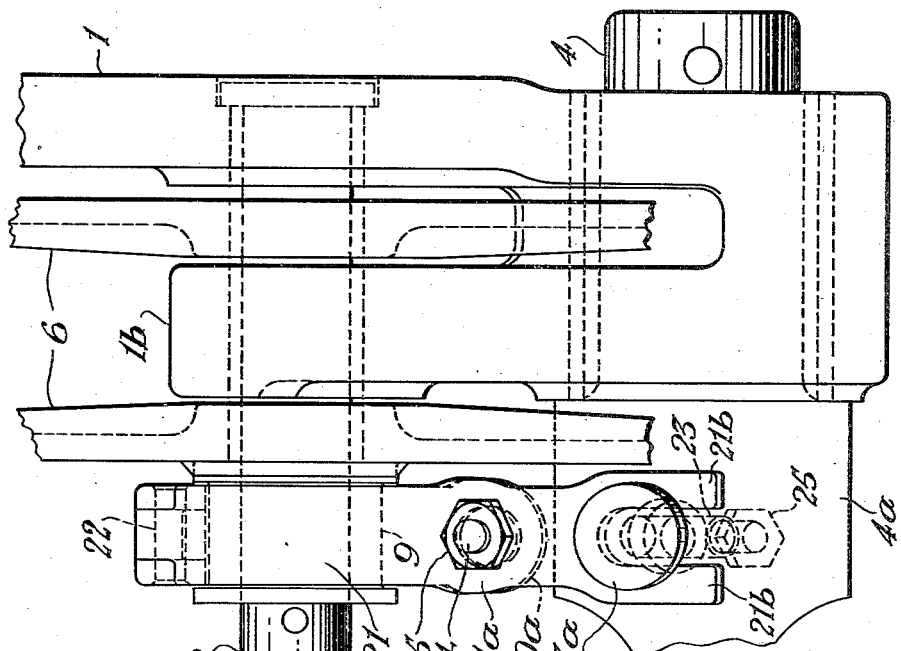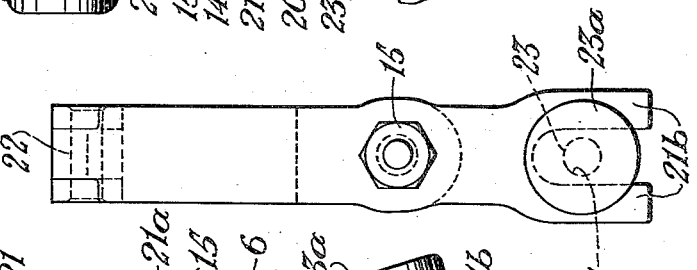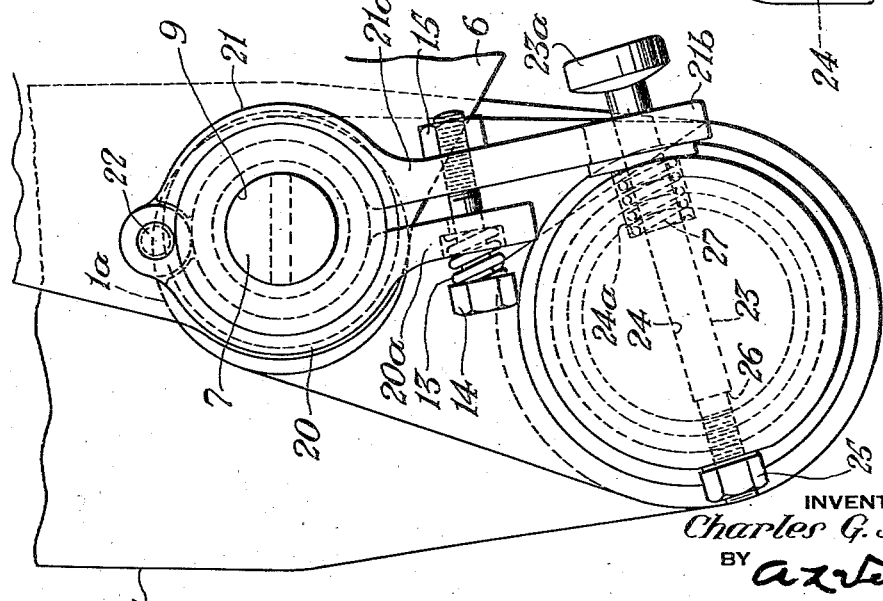

June 5, 1945.                C. G. SMITH                2,377,817
                       BRAKE HEAD BALANCING DEVICE
                     Filed Oct. 2, 1943        4 Sheets-Sheet 3
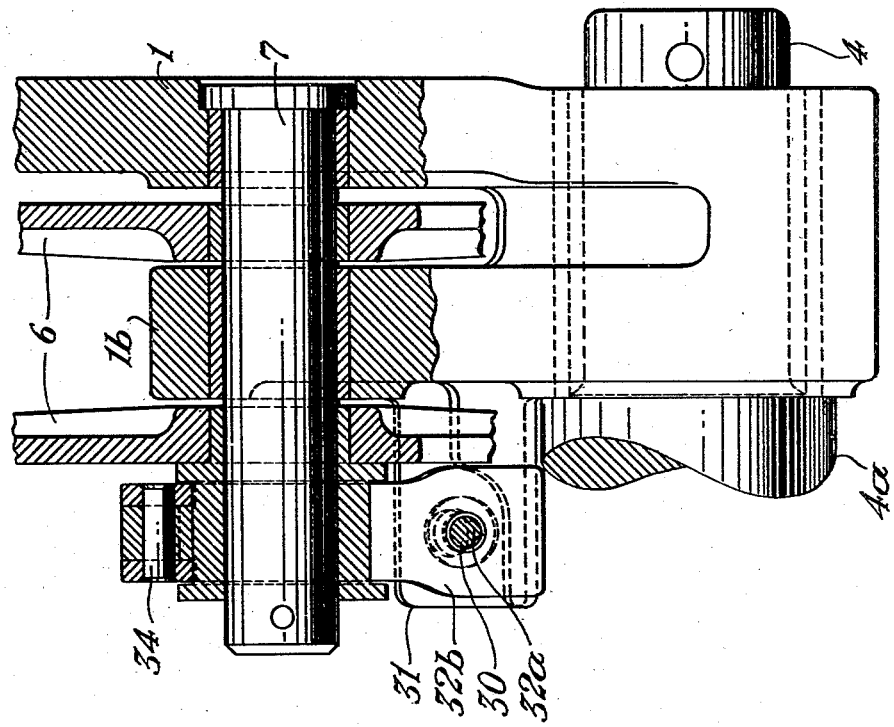
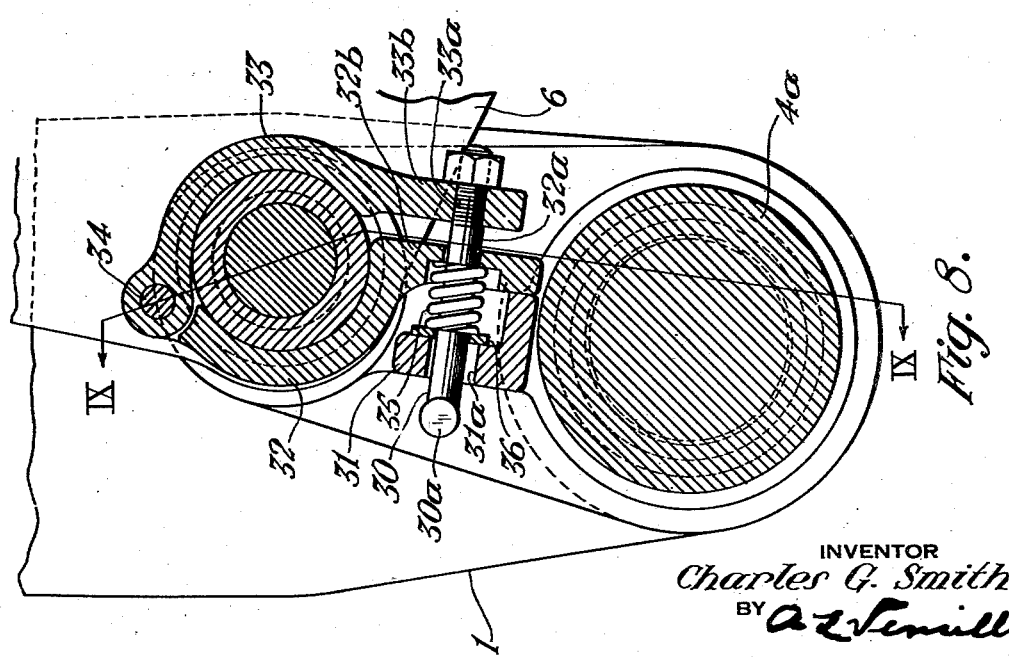
INVENTOR
Charles G. Smith
BY
HIS ATTORNEY June 5, 1945.  C. G. SMITH  2,377,817
BRAKE HEAD BALANCING DEVICE
Filed Oct. 2, 1943  4 Sheets-Sheet 4

INVENTOR
Charles G. Smith.
BY
HIS ATTORNEY

Patented June 5, 1945

2,377,817

UNITED STATES PATENT OFFICE 2,377,817

BRAKE HEAD BALANCING DEVICE

Charles G. Smith, Wilkinsburg, Pa., assignor to The American Brake Company, Swissvale, Pa., a corporation of Missouri Application October 2, 1943, Serial No. 504,719

9 Claims. (Cl. 188—212)

My invention relates to brake head balancing devices.

One of the problems in the construction of locomotive brake rigging is that of insuring correct positioning of the brake heads and brake shoes with respect to the associated wheels when the hangers which support the brake heads are in their released positions. The brake heads are usually attached to the hangers by pins, and are of necessity so constructed that the centers of gravity of the heads and shoes are some distance away from the supporting pins in the direction of the treads of the associated wheels. As a result, unless some balancing means are provided to overcome the force of gravity acting on the brake heads, when the hanger levers move to their released positions the brake heads will rotate about the supporting pins to positions in which the upper ends of the brake shoes will drag, thereby causing heating of the wheel rims and a gradual wearing away of the tops of the brake shoes, which latter, in turn, produces a reduction in shoe area with consequent higher unit pressure on the shoes when the brakes are applied.

This tendency of the brake shoes to drag can be eliminated by providing adjustable spring pressure against the bottom of the brake heads sufficient to balance the force of gravity tending to rotate the heads and shoes to the dragging position, but this method of balancing the heads is not entirely satisfactory due to the difficulty of providing the frequent manual adjustment which is necessary.

To overcome this difficulty with adjustable spring balancing arrangements various frictional arrangements have been devised to hold the brake heads and shoes, when the brakes are released, in the positions relative to the hangers they assumed during the last brake application. These schemes are entirely satisfactory when all parts of the brake shoes can be located a sufficient distance below the brake hanger suspension pin, but are not satisfactory when long shoes or short hangers make it necessary to decrease this distance. In the latter cases, it is desirable to supplement the frictional positioning means with means to give the top of the shoe an additional movement away from the wheel tread when the brakes are released, this additional movement generally being referred to as a "kick-back."

One object of my invention is to provide a novel frictional positioning means including the above referred to "kick-back" feature, which means can be readily applied to return type hanger levers even under conditions of limited clearance between adjacent wheels.

Another object of my invention is to provide brake head balancing means which will automaticaly adjust itself in response to shoe and wheel wear to maintain the brake shoes substantially concentric with the wheels at all times.

According to my invention, the brake head is pivotally attached to the hanger lever by a pivot pin which passes through a friction drum secured to the brake head in place of the bushing through which the supporting pin usually passes. This drum projects from one side of the brake head and is arranged to be frictionally gripped by two friction members which are spring pressed into engagement with the drum with sufficient force to prevent relative rotation between the brake head and friction shoes due to the force of gravity acting on the brake head. The friction members are operatively connected with the hanger lever by yieldable means which, when the hanger lever is moved to its released position, is effective to rotate the brake head and associated shoe through a sufficient distance to move the upper end of the shoe completely clear of the tread of the associated wheel.

Other objects and characteristic features of my invention will become apparent as the description proceeds.

I shall describe several forms of brake head balancing devices embodying my invention, and shall then point out the novel features thereof in claims.

Figure 10:
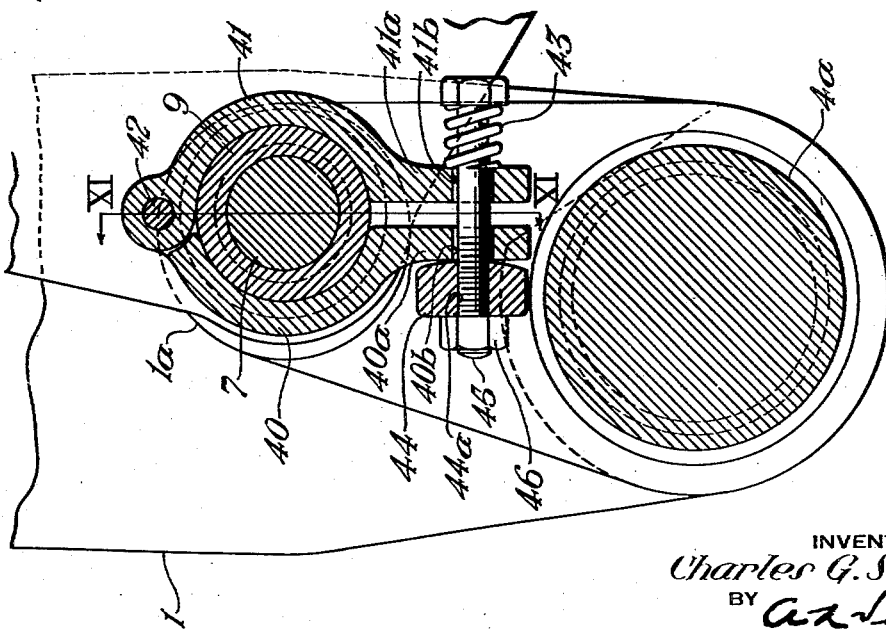

In the accompanying drawings, Fig. 1 is an elevational view showing brake equipment embodying my invention, the equipment being shown in the released position. Fig. 2 is an enlarged fragmentary view of the brake equipment embodying my invention with certain parts shown in cross section to better illustrate their construction. Fig. 3 is a side view of Fig. 2, with some of the parts broken away and others shown in section. Fig. 4 is a sectional view taken on the line IV—IV of Fig. 2. Fig. 5 is a fragmentary view of another brake equipment embodying my invention, the equipment being shown in the applied position. Fig. 6 is a side view of the equipment shown in Fig. 5. Fig. 7 is a detail view of a portion of the equipment shown in Figs. 5 and 6. Fig. 8 is a fragmentary view, partly sectioned, of another brake equipment embodying a still different form of my invention. Fig. 9 is a sectional view taken on the line IX—IX of Fig. 8. Fig. 10 is a fragmentary view of still another brake equipment embodying a further form of my invention. Fig. 11 is a sectional view taken on the line XI—XI of Fig. 10.

Similar reference characters refer to similar parts in each of the several views.

Referring first to Figs. 1 to 4, the brake equipment here shown comprises a brake hanger 1 pivotally secured at its upper end by means of a pivot pin 2 to the frame 3 of a railway vehicle, and operatively connected at its lower end with a brake beam 4 by means of which the hanger may at times be moved toward an adjacent wheel 5 from a released position in which it is shown in Fig. 1 to a brake applying position in which it is shown in Fig. 2.

The brake hanger 1 is of the return type, that is to say, it has a main body portion 1a which is disposed outside of the plane of the wheels and a return portion 1b at its lower end which extends into the plane of the wheels between the wheels. A brake head 6 is pivotally attached to the return portion 1b by means of a pivot pin 7, and carries a brake shoe 8, which when the hanger 1 is moved to its brake applying position, frictionally engages the periphery of the wheel 5.

The center of gravity of the brake head 6 and brake shoe 8 is of necessity located between the pivot pin 7 and the wheel 5, and as a result, when the hanger 1 is moved to its released position, the head and shoe tend to rotate about the pivot pin in a clockwise direction as viewed in Fig. 1, thereby moving the upper end of the brake shoe toward the wheel. When, due to clearance conditions, the permissible amount of movement of the lever 1 between its applied and released positions is small, this rotation of the brake head and shoe will cause the shoe to drag, which, in turn, will cause heating of the wheel, and will result in a gradual wearing away of the top of the shoe. If the top of the shoe is permitted to wear away, the available shoe area is decreased, and the unit pressure on the shoe when the brakes are applied is correspondingly increased.

In accordance with my present invention, I overcome this tendency of the brake shoe to drag by securing to one of the supporting flanges of the brake head 6 a friction drum 9. This friction drum is formed with a tubular end portion 9a which is pressed into the opening in the associated supporting flange in place of the usual bushing, and is preferably secured in place as by welding. The main portion of the drum projects from the side of the brake head, and cooperates with two friction members 10 and 11 which straddle the drum between confronting annular shoulders 9b and 9c formed on the drum. The friction members are pivotally connected together at one side of the drum by a pivot pin 12, and are formed at the opposite side of the drum with laterally projecting arms 10a and 11a, respectively. The arms 10a and 11a are yieldably urged toward each other to cause the friction members to exert a frictional force on the friction drum by means of a compressed coil spring 13 mounted on a bolt 14. The bolt 14 extends with clearance through a hole 10b in the arm 10a and is adjustably screwed into a threaded hole 11b provided in the arm 11. The spring is disposed on the bolt 14 between the head of the bolt and the bottom of an annular recess 10c formed in the arm 10a at the outer end of the hole 10b, and is compressed to such an extent that the frictional force exerted on the brake drum by the friction members will be sufficient to prevent relative rotation between the drum and friction member due to the force of gravity acting on the unbalanced weight of the brake head and brake shoe. The bolt 14 is maintained in its adjusted position by a jam nut 15 screwed onto the threaded end of the bolt.

The friction member 10 is further provided with a laterally projecting lug 10d which cooperates with a stop lug 16 formed on the hanger 1 to limit the movement of the friction members relative to the hanger in one direction under certain conditions which will be made clear presently. The movement of the friction member relative to the hanger 1 in the opposite direction is limited by a stop bolt 17 which extends through a clearance hole 10e provided in the lug 10 and is adjustably screwed into the screw threaded hole 16a provided in the lug 16. The bolt 16 is locked in its adjusted position by means of a jam nut 18. Surrounding the bolt 17 between the two lugs 10d and 16 is a compressed coil spring 19 which constantly biases the friction members to the angular positions in which the lug 10d engages the head of the bolt 17.

In operation, the force of the spring 13 causes the friction members 10 and 11 to grip the friction drum 9 with sufficient force to hold the brake head and brake shoe in the same relative positions with respect to the friction members when the brakes are released as when in their applied positions, and the bolt 17 is so adjusted that when the brakes are released, the friction members will be rotated by engagement of the spring 19 with the lug 10d to such relative positions with respect to the hanger 1 that the face of the brake shoe will be substantially concentric with the wheel.

With the parts arranged in this manner when the brakes become applied the spring 19 becomes compressed and permits the brake head and brake shoe to turn on its pivot relative to the hanger a sufficient amount to compensate for the swinging of the hanger and thus maintain the brake shoe substantially concentric with the wheel. In the applied position the lug 10d engages the stop lug 16, and as a result, any change in angularity between the brake head and hanger resulting from any additional movement of the hanger which may be necessary to compensate for shoe wear will cause the friction drum 9 to rotate relative to the friction members 10 and 11 a sufficient amount to restore the shoe and wheel to concentric relation, thereby automatically maintaining the shoe in concentric relation to the wheels at all times.

Upon the release of the brakes the spring 19 will expand and will turn the friction members 10 and 11, the friction drum 9, the brake head 6 and the brake shoe 8 as a unit about the pivot pin 7 until the lug 10d engages the head of the bolt 17. This absolutely prevents the shoe from dragging in the released position, and also allows for a shorter swinging movement of the hanger in applying and releasing the brakes.

Referring now to Figs. 5, 6 and 7 in the modified form of my invention here shown, the friction drum 9 cooperates with two friction members 20 and 21 which are pivotally connected together at one side of the drum by a pivot pin 22, and which are provided at the opposite side of the drum with laterally projecting arms 20a and 21a. These arms are yieldably urged together by means of the spring 13 and bolt 14 in substantially the same manner that the arms 10a and 11a of the friction members 10 and 11 in the preceding views are yieldably urged together by the spring 13 and bolt 14. The arm 21a is considerably longer than the arm 20a, and is formed with a forked end 21b which straddles the shank of a bolt 23 mounted in a hole 24 provided in the shoulder 4a of the brake beam 4. The bolt 23 is formed with a large head 23a and is secured in a fixed longitudinal position in the hole 4 by means of a nut 25 and a shoulder 26. The head 23a of the bolt 23 is spaced from the shoulder 4a an amount which permits the necessary movement between the brake head and the hanger to maintain the brake shoe concentric to the wheel in both the applied and released positions of the brakes. The arm 21a is constantly biased to the position in which it engages the head 23a by means of a compressed coil spring 27 mounted in a counterbore 24a provided in the upper end of the hole 24.

The operation of the balancing means shown in Figs. 5, 6 and 7 is essentially the same as the operation of the balancing means shown in the preceding views. When the brakes are released, the spring 27 maintains the arm 21a of the friction member 21 in engagement with the head of the bolt 23, and the parts are so proportioned that under these conditions the brake shoe and brake head will be concentric with the wheel 5. When the brakes become applied, the brake head 6 is caused to rotate about the pivot pin 7 to the position in which the face of the brake shoe becomes concentric with the wheels, and this rotation causes the arm 21b to rotate from the position in which it engages the head 23a of the bolt 23 to the position in which it engages the shoulder 4a of the axle 4, thereby compressing the spring 27 beyond its initial compression. Upon the subsequent release of the brakes, the spring 27 expands and kicks back the brake head to the position in which the arm 21a engages the head 23a of the bolt 23, thereby maintaining the brake shoe concentric with the wheel in this position of the brakes. If shoe and wheel wear occurs, the resulting change in angularity between the brake head and hanger caused by the additional movement of the hanger necessary to apply the brakes will cause the friction drum to slip relative to the friction members an amount sufficient to restore the brake head to the proper concentric relation with respect to the wheel in both the applied and released positions of the brakes.

Referring next to Figs. 8 and 9, I have here shown a balancing means which provides the kick-back feature with a single bolt 30. This bolt extends with clearance through aligned holes 31a and 32a provided respectively in a lug 31 formed on the side of the hanger 1 and in the laterally projecting arm 32b of a friction member 32, and is adjustably screwed into a screw threaded hole 33a formed in the laterally projecting arm 33b of a friction member 33. The friction members 32 and 33 cooperate with the brake drum 9 in the same manner as the members 10 and 11 in Figs. 1, 2 and 3, and are pivotally connected together at the side of the drum opposite to the arms by means of a pivot pin 34. The bolt 30 is surrounded between the lug 31 and the arm 32b by a coil spring 35, one end of which abuts against a washer 36 interposed between the spring and the lug 31 and the other end of which extends into a counterbore formed in the outer end of the hole 32a. The bolt 30 is so adjusted that when the brakes are released and its head 30a is in engagement with the lug 31, the brake head 6 and brake shoe will occupy a position concentric to the wheel, and the parts are so proportioned that when the brakes are applied the rotation of the brake head necessary to cause the brake shoe to assume a position concentric with the wheel will cause the arm 32b to engage the lug 31 and thus compress the spring 35 beyond its initial compression.

The operation of the balancing device as shown in Figs. 8, 9 and 10 is similar to the operation of the devices described in the preceding views and will be apparent from the foregoing description and from an inspection of the drawings without further detailed description.

Under some conditions of operation the kick-back feature is not necessary to prevent the brake shoes from dragging when the brakes are released provided the balancing means is effective to retain the head in the same position relative to the hanger in the released position that it occupies in the applied condition, and when this is the case, this result can be accomplished by means of the balancing means shown in Figs. 10 and 11. Referring to these figures as here shown, the friction drum 9 cooperates with two friction members 40 and 41 provided with laterally projecting arms 40a and 41a. The friction members 40 and 41 are pivotally connected together by means of a pivot pin 42, and are constantly biased into frictional contact with the drum by a compressed coil spring 43 which also biases the members to the relative position with respect to the hanger 1 in which the arm 40a engages a laterally projecting lug 44 cast on the side of the hanger. The spring is mounted on a bolt 45 which extends with clearance through aligned holes 40b and 41b formed in the arms 40a and 40b, and is adjustably screwed into a threaded hole 44a provided in the lug 44. The spring is disposed on the bolt between the arm 41a and the head of the bolt, and is compressed by adjusting the bolt, an amount which is sufficient to prevent relative rotation between the friction drum and the friction members 40 and 41 due to the force of gravity acting on the unbalanced weight of the brake head and brake shoe, but which amount will permit the brake shoe to automatically adjust itself relative to the hanger to a position concentric to the wheels as the brake shoe and wheel become worn. The bolt 45 is arranged to be locked in its adjusted position by a jam nut 46.

Although I have herein shown and described only a few forms of brake head balancing devices embodying my invention, it is understood that various changes and modifications may be made therein within the scope of the appended claims without departing from the spirit and scope of my invention.

Having thus described my invention, what I claim is:

1. In combination, a brake hanger pivotally suspended adjacent a vehicle wheel for movement toward and away from the wheel to applied and released positions, a brake head pivotally attached by means of a pivot pin to said hanger, a friction drum secured to one side of said head and surrounding one end of said pivot pin, and two friction members pressed into frictional engagement with the drum and secured to said hanger, said friction members being effective to retain said head in the same position relative to said friction members in both the applied and released positions of said hanger.

2. The combination with a brake hanger pivotally supported adjacent a vehicle wheel for movement toward and away from the wheel to applied and released positions and a brake head pivotally attached to said hanger and carrying a brake shoe for frictional engagement with said wheel, of means for positioning said brake head and shoe relative to said hanger in the released position of the hanger to prevent said brake shoe from dragging, said means comprising a laterally projecting friction drum secured to said brake head concentric with the pivotal axis thereof, two friction members surrounding said drum and non-rotatably secured to said hanger, and means for causing said friction members to grip said drum with sufficient force to prevent rotation of said brake head and shoe in response to the force of gravity acting on the unbalanced weight of said drum and shoe.

3. The combination with a brake hanger, of a brake head having supporting flanges provided with aligned openings, a supporting pin extending through said hanger and said openings, a friction drum secured within one of said openings and projecting from one side of the associated flange, a pair of friction members cooperating with said friction drum, means for pressing said members into engagement with said drum with sufficient force to prevent relative rotation between said drum and said members due to the force of gravity acting on the unbalanced weight of said brake head, means for limiting movement of said friction members relative to said hanger, and means for biasing said members in one direction to the limit of the permissible movement.

4. The combination with a brake hanger pivotally supported adjacent a vehicle wheel for movement toward and away from the wheel to applied and released positions and a brake head pivotally attached to said hanger and carrying a brake shoe for frictional engagement with said wheel, of means for maintaining said shoe concentric with the wheel in both the applied and released positions of said hanger comprising a laterally projecting friction drum secured to said brake head concentric to the pivotal axis thereof, a pair of friction members surrounding said drum and clamped into frictional contact therewith with sufficient force to prevent relative rotation between said members and said drum due to the force of gravity acting on the unbalanced weight of said friction drum and said shoe, means for limiting movement of said members relative to said hanger between a position in which said shoe will be concentric to the wheel when the hanger occupies its applied position and another position in which said shoe will be concentric with the wheel when the hanger occupies its released position, and means for biasing said members to said other position relative to said hanger.

5. The combination with a brake hanger pivotally supported adjacent a vehicle wheel for movement toward and away from the wheel to applied and released positions and a brake head pivotally attached to said hanger and carrying a brake shoe for frictional engagement with said wheel, of means for maintaining said shoe concentric with the wheel in both the applied and released positions of said hanger comprising a laterally projecting friction device secured to said brake head concentric to the pivotal axis thereof, a pair of friction members surrounding said device and pivotally connected together at one side thereof and provided at the other side thereof with laterally projecting arms, a bolt passing through a clearance hole provided in one of said arms and adjustably screwed into a screw threaded hole provided in the other arm, a compressed spring disposed on said bolt and exerting a force on said arms which clamps said member into frictional contact with said drum, a first laterally projecting lug provided on one of said members at the pivotal end thereof, a stop lug provided on said hanger, a second bolt passing through a clearance hole formed in said first mentioned lug and adjustably screwed into said stop lug, and a compressed coil spring surrounding said bolt between said two lugs.

6. The combination with a brake hanger pivotally supported adjacent a vehicle wheel for movement toward and away from the wheel to applied and released positions and a brake head pivotally attached to said hanger and carrying a brake shoe for frictional engagement with said wheel, of means for maintaining said shoe concentric with the wheel in both the applied and released positions of said hanger comprising a laterally projecting friction device secured to said brake head concentric to the pivotal axis thereof, a pair of friction members surrounding said device and pivotally connected together at one side thereof and provided at the other side thereof with laterally projecting arms, a bolt passing through a clearance hole provided in one of said arms and adjustably screwed into a screw threaded hole provided in the other arm, a compressed spring disposed on said bolt and exerting a force on said arms which clamps said members into frictional contact with said device, a first laterally projecting lug provided on one of said members at the pivotal end thereof, a stop lug provided on said hanger, a second bolt passing through a clearance hole formed in said first mentioned lug and adjustably screwed into said stop lug, and a compressed coil spring surrounding said bolt between said two lugs, said second bolt being so adjusted and the parts being so proportioned that said brake shoe will be concentric with the wheel when said hanger occupies its released position and said first lug is engaging the head of said bolt and also when said hanger occupies its applied position and said first lug is engaging said stop lug.

7. The combination with a brake hanger pivotally supported adjacent a vehicle wheel for movement toward and away from the wheel to applied and released positions and a brake head pivotally attached to said hanger and carrying a brake shoe for frictional engagement with said wheel, of means for maintaining said shoe concentric with the wheel in both the applied and released positions of said hanger comprising a laterally projecting friction drum secured to said brake head concentric to the pivotal axis thereof, a pair of friction members surrounding said drum and pivotally connected together at one side thereof and provided at the other side thereof with laterally projecting arms, a stop lug secured to said hanger and provided with a hole, a bolt extending with clearance through said hole and through a hole provided in one of said arms and adjustably screwed into the other arm, and a compressed spring disposed on said bolt between said lug and said one arm.

8. The combination with a brake hanger pivotally supported adjacent a vehicle wheel for movement toward and away from the wheel to applied and released positions and a brake head pivotally attached to said hanger and carrying a brake shoe for frictional engagement with said wheel, of means for maintaining said shoe concentric with the wheel in both the applied and released positions of said hanger comprising a laterally projecting friction drum secured to said brake head concentric to the pivotal axis thereof, a pair of friction members surrounding said drum and pivotally connected together at one side thereof and provided at the other side thereof with laterally projecting arms, a stop lug secured to said hanger and provided with a hole, a bolt extending with clearance through said hole and through a hole provided in one of said arms and adjustably screwed into the other arm, and a compressed spring disposed on said bolt between said lug and said one arm, said bolt being so adjusted and the parts being so proportioned that said brake shoe will be concentric with the wheel when said hanger occupies its released position and the head of said bolt is engaging said lug and also when said hanger occupies its applied position and said one arm is engaging said lug.

9. The combination with a brake hanger pivotally supported at one end adjacent a vehicle wheel and connected at the other end with a brake beam for moving said hanger toward and away from the wheel to applied and released positions and a brake head pivotally attached to said hanger and carrying a brake shoe for frictional engagement with said wheel, of means for maintaining said shoe concentric with the wheel in both the applied and released positions of said hanger comprising a laterally projecting friction drum secured to said brake head concentric to the pivotal axis thereof, a pair of friction members surrounding said drum and pivotally connected together at one side thereof and provided at the opposite side with laterally projecting arms one of which is formed with a bifurcated end, a first bolt passing through a clearance hole in the one arm and adjustably screwed into a screw threaded hole provided in the other arm, a compressed spring disposed on said bolt and exerting a force on said arms which clamps said members into frictional contact with said drum, a second bolt secured to said brake beam and extending between the bifurcations of said bifurcated end and having its head spaced from said beam, the parts being so proportioned that said brake shoe will be concentric with the wheel when said bifurcated arm is engaging said beam and said hanger occupies its released position and also when said bifurcated arm engages the head of said bolt and said beam occupies its applied position, and spring means biasing said bifurcated arm to the position in which it engages the head of said bolt.

CHARLES G. SMITH.